3,234,246
Δ¹-3,11,20-TRIKETO-17α-HYDROXY-21-LOWER ALKANOYLOXY-4-BROMO-PREGNENE
Evelyn H. Wilson, Highland Park, N.J., assignor to Merck & Co., Inc., Rahway, N.J., a corporation of New Jersey
No Drawing. Filed Jan. 14, 1955, Ser. No. 481,964
2 Claims. (Cl. 260—397.45)

This application is a continuation-in-part of our co-pending applications Serial Number 227,102, filed May 18, 1951, now Patent No. 2,773,075, and Serial Number 299,902, filed July 19, 1952, now Patent No. 2,957,892.

This invention is concerned generally with Δ¹-unsaturated compounds of the pregnane series and with processes of preparing them. More particularly, it relates to Δ¹-3,11,20-triketo-17-hydroxy-21-oxygenated - steroids of the pregnane series which may also have a Δ⁴-unsaturated linkage, and with processes of preparing these novel Δ¹-steroid compounds. These new Δ¹-3,11,20-triketo-17-hydroxy-21-oxygenated-steroids have been demonstrated to possess pharmacological activity similar to that shown by cortisone and are thus of value in the treatment of conditions which heretofore responded to the administration of the adrenal hormones, cortisone. Moreover, in addition to possessing cortisone-activity, these new Δ¹3,11,20-triketo-17-hydroxy - 21 - oxygenated-steroids differ from cortisone in not possessing any appreciable sodium or water retention action. Accordingly, these Δ¹-3,11,20-triketo-17-hydroxy-21-oxygenated steroid compounds are especially effective in the treatment of arthritis and related diseases since they can be administered for their cortisone action without producing undesired metabolic effects such as edema, which results from the sodium and water retention action of cortisone.

These Δ¹-3,11,20-triketo-17-hydroxy-21-oxygenated-steroid compounds may be chemically represented as follows:

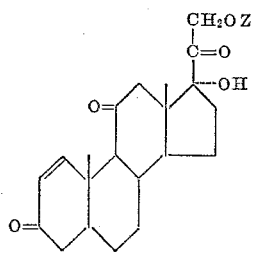

wherein Z is hydrogen or an acyl radical.

The Δ¹-3,11,20-triketo - 17 - hydroxy - 21 - oxygenated-steroid compounds, subject of the present invention, can be prepared by reacting the corresponding 2-halo-3,11,20-triketo-17-hydroxy-21-acyloxy-steroid compound with a dehydrohalogenating agent. This reaction may be chemically represented as follows:

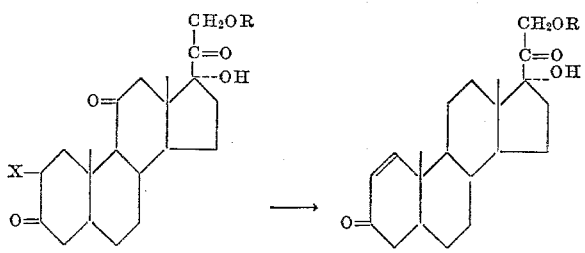

wherein X is halogen and R is an acyl radical.

The 2-halo-3,11,20-triketo-17 - hydroxy - 21 - acyloxy-steroid compounds used as starting materials include 2-bromo-3,11,20-triketo-17α-hydroxy-21-acyloxy - allopregnanes such as 2-bromo-3,11,20-triketo-17α-hydroxy-21-acetoxy-allopregnane,
2-bromo-3,11,20-triketo-17α-hydroxy-21-propionoxy-allopregnane,
2-bromo-3,11,20-triketo-17α-hydroxy-21-benzoxy-allopregnane,
2-bromo-3,11,20-triketo-17α-hydroxy-21-acyloxy-pregnanes, such as,
2-bromo-3,11,20-triketo-17α-hydroxy-21-acetoxy-pregnane,
2-bromo-3,11,20-triketo-17α-hydroxy-21-propionoxy-pregnane,
2-bromo-3,11,20-triketo-17α-hydroxy-21-benzoxy-pregnane,
2,4-dibromo-3,11,20-triketo-17α-hydroxy-21-acyloxy-allopregnanes, such as
2,4-dibromo-3,11,20-triketo-17α-hydroxy-21-acetoxy-allopregnane,
2,4-dibromo-3,11,20-triketo-17α-hydroxy-21-propionoxy-allopregnane,
2,4-dibromo-3,11,20-triketo-17α-hydroxy-21-benzoxy-allopregnane,
2,4-dibromo-3,11,20-triketo-17α-hydroxy-21-acyloxy-pregnanes, such as
2,4-dibromo-3,11,20-triketo-17α-hydroxy-21-acetoxy-pregnane,
2,4-dibromo-3,11,20-triketo-17α-hydroxy-21-propionoxy-pregnane,
2,4-dibromo-3,11,20-triketo-17α-hydroxy-21-benzoxy-pregnane, as well as the corresponding chloro and iodo derivatives and the like.

The reaction between the 2-halo-3,11,20-triketo-17-hydroxy-21-acyloxy-steroid compound and the dehydrohalogenating agent can be conveniently conducted by reacting the 2-halo-3,11,20-triketo-17-hydroxy-21-acyloxy-steroid compound with a tertiary amine such as pyridine, collidine, and the like. It is preferred, however, to utilize 2,4-dinitrophenylhydrazine or semicarbazide in conjunction with pyruvic acid as the dehydrohalogenating agent. When the 2-halo-3,11,20-triketo-17-hydroxy-21-acyloxy-steroid is a 2,2-dihalo-3,11,20-triketo-17-hydroxy-21-acyloxy-steroid of the pregnane series, such as 2,2,4-tribromo-3,11,20-triketo-17α-hydroxy-21-acetoxy - allopregnane, an alkali metal iodide, such as sodium iodide, may be used as the dehydrohalogenating agent. When the 2,4-dinitrophenylhydrazine is used, the 2-halo-3,11,20-triketo-17-hydroxy-21-acyloxy-steroid compound is preferably brought into contact with the 2,4-dinitrophenylhydrazine in a medium comprising glacial acetic acid, at a temperature of about 50–55° C. The intermediate 2,4-dinitrophenylhydrazone of Δ¹-3,11,20-triketo-17-hydroxy-21-acyloxy-steroid compound is conveniently recovered from the glacial acetic acid reaction mixture by diluting the latter with water and cooling, whereupon the hydrazone compound crystallizes as an orange solid, which is recovered by filtration and dried. The crude hydrazone, thus obtained is then heated with a solution of pyruvic acid in acetic acid at an elevated temperature of approximately 80–85° C. At this temperature, the hydrolysis of the hydrazone is ordinarily complete in less than one hour, but the hydrolysis reaction is preferably carried out for a period of about five to six hours. The product is conveniently recovered from the hydrolysis solution by evaporating the latter to small volume and diluting the residual solution with chloroform. The by-product impurities which precipitate are separated from the resulting solution by filtration, and the chloroform filtrate is then washed with water and aqueous alkaline solution to remove additional impurities. This chloroform solution can then be evaporated, if desired, to obtain the corresponding $\Delta^1$-3,11,20-triketo-17,21-dihydroxy-steroid compound such as $\Delta^1$-3,11,20-triketo-17α,21-dihydroxy-allopregnene, $\Delta^1$-3,11,20-triketo-17α,21-dihydroxy-pregnene, $\Delta^{1,4}$-3,11,20-triketo-17α,21-dihydroxy-pregnadiene, etc. It is ordinarily preferred, however, to treat the chloroform solution with an acylating agent, such as acetic anhydride and pyridine, thereby acylating the 21-hydroxy substituent. The acylated product is readily separated from the chloroform solution by conventional means, and purified by recrystallization from a solvent such as ethyl acetate to give the substantially pure $\Delta^1$-3,11,20-triketo-17-hydroxy-21-acyloxy-steroid compound.

In accordance with this procedure, there are obtained $\Delta^1$-3,11,20-triketo-17-hydroxy-21-acyloxy-steroid compound as, for example,
$\Delta^1$-3,11,20-triketo-17α-hydroxy-21-acyloxy-allopregnenes, such as
$\Delta^1$-3,11,20-triketo-17α-hydroxy-21-acetoxy-allopregnene,
$\Delta^1$-3,11,20-triketo-17α-hydroxy-21-propionoxy-allopregnene,
$\Delta^1$-3,11,20-triketo-17α-hydroxy-21-benzoxy-allopregnene,
$\Delta^1$-3,11,20-triketo-17α-hydroxy-21-acyloxy-pregnenes,
$\Delta^1$-3,11,20-triketo-17α-hydroxy-21-acetoxy-pregnene,
$\Delta^1$-3,11,20-triketo-17α-hydroxy-21-propionoxy-pregnene,
$\Delta^1$-3,11,20-triketo-17α-hydroxy-21-benzoxy-pregnene,
$\Delta^{1,4}$-3,11,20-triketo-17α-hydroxy-21-acyloxy-pregnadienes, such as
$\Delta^{1,4}$-3,11,20-triketo-17α-hydroxy-21-alkanoyloxy-pregnadienes,
$\Delta^{1,4}$-3,11,20-triketo-17α-hydroxy-21-acetoxy-pregnadiene,
$\Delta^{1,4}$-3,11,20-triketo-17α-hydroxy-21-propionoxy-pregnadiene,
$\Delta^{1,4}$-3,11,20-triketo-17α-hydroxy-21-benzoxy-pregnadiene,
and the like.

The following examples illustrate methods of carrying out the present invention, but it is to be understood that these examples are given for purposes of illustration and not of limitation.

Example 1

A mixture of 4.38 g. (0.009 mole) of 2-bromo-3,11,20-triketo-17α-hydroxy-21-acetoxy-allopregnene, 2.2 g. of 2,4-dinitrophenylhydrazine and 125 cc. of glacial acetic acid is heated, with agitation under a nitrogen atmosphere for a period of approximately three hours at a temperature of approximately 50–55° C. Three hundred and seventy-five cubic centimeters of distilled water is added to the reaction mixture, and the resulting mixture is cooled and maintained at a temperature of about 0° C. for a period of approximately two hours. The orange solid which precipitates is recovered by filtration, washed well with water and air dried, to give the crude 2,4-dinitrophenylhydrazone of $\Delta^1$-3,11,20-triketo-17α-hydroxy-21-acetoxy-allopregnene.

This crude hydrazone is mixed with 175 cc. of 90% aqueous pyruvic acid and 35 cc. of glacial acetic acid, and the mixture is heated under nitrogen, with agitation, at a temperature of about 80–85° C. for a period of approximately five and one-half years. (A clear solution is obtained after heating the mixture for a period of approximately forty-five minutes.) The reaction solution is evaporated in vacuo to a small volume, and the residual solution is diluted with a large quantity of chloroform. The solid material which precipitates is removed by filtration, and the chloroform filtrate is extracted with two portions of water, with three portions of dilute aqueous potassium bicarbonate solution, and finally with another portion of water. Evaporation of this washed chloroform solution to dryness gives $\Delta^1$-3,11,20-triketo-17α,21-dihydroxy-allopregnene. Alternatively, the washed chloroform solution is evaporated to one-half its initial volume at approximately atmospheric pressure.

To the dark chloroform solution thus obtained are added 20 cc. of acetic anhydride and 5 cc. of pyridine. The resulting solution is maintained at approximately room temperature for a period of about fifteen hours. The reaction solution is then shaken with water, and the chloroform layer is washed successively with a 2.5 N aqueous solution of hydrochloric acid, with water, with dilute aqueous potassium bicarbonate solution, and finally with water. The washed chloroform solution is dried over anhydrous calcium sulfate (Drierite), and the dry chloroform solution is then passed through a column containing 100 g. of acid-washed alumina. The chloroform eluates from the initial solution and washings are combined and treated with activated charcoal (Norbit), filtered and the filtered solution is evaporated to dryness in vacuo. The residual material is recrystallized from ethyl acetate to give 900 mg. of $\Delta^1$-3,11,20-triketo-17α-hydroxy-21-acetoxy-allopregnene which is obtained in the form of fine white needles; M.P. 253–256° C. (dec.); $[\alpha]_D^{24°\,c.}=+115°$ (0.2% in chloroform);

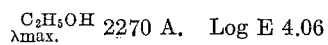

*Analysis.*—Calc'd for $C_{23}H_{30}O_6$: C, 68.63; H, 7.51. Found: C, 68.53; H, 7.66.

The 2-bromo-3,11,20-triketo-17α-hydroxy-21-acetoxy-allopregnane used as starting material in this example may be prepared as follows: six-hundred milligrams of palladium oxide and 12 cc of 0.001 N aqueous solution of potassium hydroxide are added to a suspension of 7.25 g. (0.018 mole) of $\Delta^4$-3,11,20-triketo-17α-hydroxy-21-acetoxy-pregnene (cortisone acetate) in 600 cc. of methanol. The mixture is then reacted with hydrogen at a pressure of approximately 40 pounds per square inch while maintaining the temperature of the reactants at approximately room temperature. The absorption of hydrogen ceases after approximately one-half hour; the amount of hydrogen absorbed corresponds to 1 mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give substantially pure 3,11,20-triketo-17α-hydroxy-21-acetoxy-allopregnane.

Five hundred cc. of reagent glacial acetic acid are added to a solution containing 5.51 g. (0.0136 mole) of 3,11,20-triketo-17α-hydroxy-21-acetoxy-allopregnane dissolved in 50 cc. of chloroform. A few drops of a 1.3 N solution of hydrogen bromide in acetic acid are added, and the resulting solution is stirred while adding thereto, dropwise at room temperature, a solution containing 0.0139 mole of bromine dissolved in 19 cc. of glacial acetic acid. The reaction solution is evaporated to dryness in vacuo at a temperature of 25–35° C. The residual material is triturated with low-boiling petroleum ether, and the insoluble material is recovered by filtration and recrystallized from ethyl acetate to give 2-bromo-3,11,20-triketo-17α-hydroxy-21-acetoxy-allopregnane.

Example 2

A solution of 900 mg. of 2-bromo-3,11,20-triketo-17α-hydroxy-21-acetoxy pregnane in 5 ml. of collidine is heated for one hour under reflux, and the collidine is evaporated in vacuo. The residual material is dissolved in chloroform, and the chloroform extract is washed with dilute aqueous hydrochloric acid, then with water, dried and evaporated in vacuo to dryness. The residual material is recrystallized from ethyl acetate to give substantially pure $\Delta^1$-3,11,20-triketo-17α-hydroxy-21-acetoxy-pregnene; M.P. 244–246° C.

The 2-bromo-3,11,20-triketo-17α-hydroxy-21-acetoxy-pregnane, used as starting material in this example, may be prepared as follows: a solution containing 39.6 g. of bromine in 300 cc. of acetic acid is added to a solution containing 100 g. of 3,11,20-triketo-17α-acetoxy-pregnane dissolved in 1500 cc. of acetic acid. When the reaction is substantially complete, the solution is immediately poured into water, and the resulting suspension is extracted with chloroform. The chloroform extract is washed with water, evaporated to dryness, and the residual material crystallized from acetone-ether to give as a substantially pure crystalline product the 4-bromo-3,11,20-triketo-17α-hydroxy-21-acetoxy-pregnane.

The mother liquor from this crystallization procedure is dissolved in benzene and chromatographed over acid-washed alumina, and the chromatogram eluted with mixtures of ether and chloroform. The eluate is evaporated to dryness, and the residual crystalline material is recrystallized from ethyl acetate to give 2-bromo-3,11,20-triketo-17α-hydroxy-21-acetoxy-pregnane.

*Example 3*

Five hundred milligrams of $\Delta^{1}$-4-bromo-3,11,20-triketo-17α-hydroxy-21-acetoxy-pregnene is heated under reflux with 10 ml. of collidine for one hour; the reaction mixture is cooled and, with stirring, is treated with 35 ml. of a 2 N aqueous solution of sulfuric acid. The aqueous mixture is extracted three times with chloroform, and the combined chloroform extracts are dried and the chloroform evaporated therefrom in vacuo. The residual material is dissolved in benzene and chromatographed over 15 g. of acid-washed alumina. The chromatogram is eluated with mixtures of ether and chloroform, and the combined eluates are evaporated to dryness. The residual crystalline material is recrystallized from ethyl acetate to give substantially pure $\Delta^{1,4}$-3,11,20-triketo-17α-hydroxy-21-acetoxy-pregnadiene; M.P. 226–228° C.

One hundred milligrams of $\Delta^{1,4}$-3,11,20-triketo-17α-hydroxy-21-acetoxy-pregnadiene is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure $\Delta^{1,4}$-3,11,20-triketo-17α,21-dihydroxy-pregnadiene; M.P. 207–214° C.

The $\Delta^{1,4}$-3,11,20-triketo-17α-hydroxy-21-acetoxy-pregnene, used as starting material in this example, may be prepared as follows: four hundred mg. of $\Delta^{1}$-3,11,20-triketo-17α-hydroxy-21-acetoxy-pregnene is dissolved in 50 cc. of glacial acetic acid containing three drops of 30% hydrobromic acid in glacial acetic, and to the stirred solution is added a solution containing 0.61 ml. bromine (190 mg.) in 5 ml. of glacial acetic acid over a ten minute period. Five minutes after the addition of bromine is completed, the reaction mixture is poured into 400 ml. of ice water, and the aqueous mixture is extracted three times with chloroform. The chloroform extracts are combined, washed with aqueous sodium bicarbonate solution, then with water, dried and evaporated to dryness in vacuo to give $\Delta^{1}$-4-bromo-3,11,20-triketo-17α-hydroxy-21-acetoxy-pregnene.

*Example 4*

202 mg. of 3,11,20-triketo-17α-hydroxy-21-acetoxy-allopregnane, prepared as described in Example 1 hereinabove, is dissolved in 15 cc. of chloroform, and to the resulting mixture is added dropwise 4.3 cc. of a 0.0011 N chloroform solution of bromine in 10 cc. of chloroform. This solution is allowed to stand at room temperature for about fifteen hours, and the chloroform solution evaporated to dryness in vacuo to give 2,4-dibromo-3,11,20-triketo-17α-hydroxy-21-acetoxy-allopregnane.

This 2,4-dibromo compound is dissolved, without purification in 25 cc. of glacial acetic acid and to the solution is added 282 mg. of 2,4-dinitrophenylhydrazine. The resulting solution is heated under nitrogen at 50–55° C. for two hours, and the reaction solution is worked up in the conventional manner to give the desired $\Delta^{1,4}$-3,11,20-triketo-17α-hydroxy-21-acetoxy-pregnadiene to 3-(2,4-dinitrophenylhydrazone). This product is hydrolyzed in accordance with the procedure set forth in Example 1 hereinabove to give $\Delta^{1,4}$-3,11,20-triketo-17α,21-dihydroxy-pregnadiene.

*Example 5*

1.213 g. of 3,11,20-triketo-17α-hydroxy-21-acetoxy-allopregnane (0.003 mole) is dissolved in 15 cc. of chloroform, 2 drops of 1.3 N hydrogen bromide in acetic acid is added, and to the solution is added, dropwise with stirring, 0.009 moles of bromine in 25 cc. of chloroform. At the completion of the bromination, 750 mg. anhydrous sodium acetate is added to the reaction mixture and the resulting mixture is stirred for one hour at room temperature. The reaction mixture is filtered and the filtrate is evaporated to dryness in vacuo. The residual material, comprising 2,2,4-tribromo-allodihydro cortisone acetate, is dissolved in 250 cc. reagent acetone containing 5 g. of sodium iodide. The resulting mixture is heated under reflux for a period of 24 hours, an additional 5 g. of sodium iodide is added to the reaction mixture, and the resulting mixture is heated under reflux for an additional 16 hours. The reaction mixture is evaporated to dryness in vacuo, and the residual material is partitioned between water and chloroform. The chloroform layer is washed with aqueous sodium thiosulfate solution, aqueous sodium bicarbonate solution, and water, and is dried by distillation. The residual material is heated under reflux for a period of one-half hour with 35 cc. of gamma collidine. The reaction solution is poured into dilute aqueous sulfuric acid solution, and the aqueous mixture is extracted with chloroform. The chloroform extracts are washed with water, dried, and the residual material is treated with 3 cc. of acetic anhydride and 0.5 cc. of pyridine for about 60 hours at room temperature. Petroleum ether is added to the reaction mixture, and the gum which precipitates is stirred until it solidifies. The petroleum ether solution is decanted and the residual material is recrystallized from ethyl acetate to give $\Delta^{1,4}$-3,11,20-triketo-17α-hydroxy-21-acetoxy-pregnadiene; M.P. 210–218° C. This material may be purified further by chromatography if desired to give material melting at 226–228° C.

*Example 6*

530 mg of 3,11,20-triketo-17α-hydroxy-21-acetoxy-allopregnane (0.0013 mole) is dissolved in 50 cc. of dry chloroform. The solution is stirred at room temperature while adding thereto, dropwise, 10 cc. of a solution of bromine in chloroform containing 0.0043 mole. The reaction solution thus obtained is evaporated to dryness in vacuo, and the residual material is dissolved in 50 cc. of acetonitrile. To this solution is added 1.0 g. of semicarbazide free base (0.013 mole) and 2 cc. of glacial acetic acid. The resulting mixture is stirred at room temperature for 48 hours, and then heated under reflux for seven hours. The reaction mixture is evaporated to dryness in vacuo, and the residual material is slurried with water, filtered and washed with water. The solid material thus obtained is dissolved in 28 cc. of glacial acetic acid, this solution is diluted with 12 cc. of water and 1 cc. of pyruvic acid is added to the solution. The resulting mixture is maintained at room temperature for about 60 hours, and is then evaporated to dryness under reduced pressure. The residual material is slurried with chloroform, the insoluble material is removed by filtration, and the filtered chloroform solution is washed with water, dilute aqueous sodium bicarbonate solution, then with water and dried. The chloroform is evaporated in vacuo to give a crude mixture comprising $\Delta^{1}$-3,11,20-triketo-17α-hydroxy-21-acetoxy-pregnene and $\Delta^{1,4}$-3,11,20-triketo-17α-hydroxy-21-acetoxy-pregnadiene. This mixture is recrystallized once from acetone and once from methanol to give, as the major product Δ¹-3,11,20-triketo-17α-hydroxy-21-acetoxy-pregnene; M.P. 237–240° C. dec. The residual mother liquor containing the Δ¹,⁴-3,11,20-triketo-17α-hydroxy-21-acetoxy-pregnadiene may be purified by chromatography to obtain the latter compound in substantially pure form.

*Example 7*

1.011 g. (.0025 m.) of allodihydro cortisone acetate is dissolved in 35 cc. freshly distilled chloroform and treated all at once at room temperature with .00825 mole of bromine in 15 cc. chloroform. Decolorization is completed in about 10 minutes. The chloroform solution is washed with water, potassium bicarbonate solution, water, and finally with brine. The solution is concentrated to dryness in vacuo at 35° C. and the residue dissolved under nitrogen in 400 cc. of acetone. 10 g. of sodium iodide is added to the acetone solution. The solution is refluxed under nitrogen 48 hours with subsequent concentration to a small volume in vacuo at room temperature. The concentrate is diluted to 500 cc. with sodium thiosulfate solution. The yellow solid that precipitates is filtered, washed well with water, and dried to give a product comprising a major proportion of Δ⁴-2-iodo-3,11,20-triketo-17α-hydroxy-21-acetoxy-pregnene and a minor proportion of Δ¹,⁴-3,11,20-triketo-17α-hydroxy-21-acetoxy-pregnadiene.

*Example 8*

461 mg. (0.001 mole) of 3,11,20-triketo-17α-hydroxy-21-acetoxy-allopregnane 3-semicarbazone which can be prepared by reacting allodihydrocortisone acetate with semicarbazide in accordance with known methods, is dissolved in 25 cc. of glacial acetic acid. This solution is maintained at room temperature while adding thereto, dropwise with stirring, 10 cc. of a solution of bromine in glacial acetic acid containing 0.002 mole. One drop of 1 N hydrogen bromide in acetic acid is added to the bromination mixture, and the resulting mixture is stirred at room temperature until decolorization is complete, about 10 minutes being required. Nitrogen is then bubbled through the decolorized mixture for 15 minutes, and, while containuing to bubble nitrogen, the mixture is warmed at 40–50° C. for four hours. Dilution of the reaction mixture with water and filtration of the resulting suspension gives a mixture of semicarbazones comprising Δ¹,⁴-3,11,20-triketo-17α-hydroxy-21-acetoxy-pregnadiene 3-semicarbazone. This product is hydrolyzed in accordance with the procedure set forth in Example 1 hereinabove to give a crude product comprising Δ¹,⁴-3,11,20-triketo-triketo-17α,21-dihydroxy-pregnadiene.

Various changes and modifications may be made in carrying out the present invention without departing from the spirit and scope thereof. Insofar as these changes and modifications are within the purview of the annexed claims, they are to be considered as part of this invention.

I claim:

1. Δ¹ - 3,11,20-triketo-17α-hydroxy-21-(lower alkanoyloxy)-4-bromo-pregnene.

2. Δ¹ - 4 - bromo-3,11,20-triketo-17α-hydroxy-21-acetoxy-pregnene.

References Cited by the Examiner

UNITED STATES PATENTS

| | | | |
|---|---|---|---|
| 2,579,479 | 12/1951 | Djerassi | 260—397.4 |
| 2,703,805 | 3/1955 | Rosenkranz | 260—397.47 |
| 2,735,855 | 2/1956 | Djerassi et al. | 260—397.45 |
| 2,756,179 | 7/1956 | Fried | 195—51 |
| 2,767,199 | 10/1956 | Djerassi et al. | 260—397.45 |
| 2,773,075 | 12/1956 | Wilson et al. | 260—397.45 |
| 2,774,775 | 12/1956 | Korman et al. | 260—397.1 |
| 2,957,892 | 10/1960 | Wilson et al. | 260—397.45 |

OTHER REFERENCES

Djerassi, Jour. Am. Chem. Soc. 69, 2404–10 (1947).
Rosenkranz, Jour. Am. Chem. Soc. 72, 1946 (1950).
Rosenkranz, Jour. Am. Chem. Soc. 72, 4077–85 (1950).

LEWIS GOTTS, *Primary Examiner.*

H. SURLE, H. J. LIDOFF, *Examiners.*